C. H. HOOVER.
SAFETY ATTACHMENT FOR AUTOMOBILE AXLES.
APPLICATION FILED AUG. 14, 1914.
1,178,722.
Patented Apr. 11, 1916.
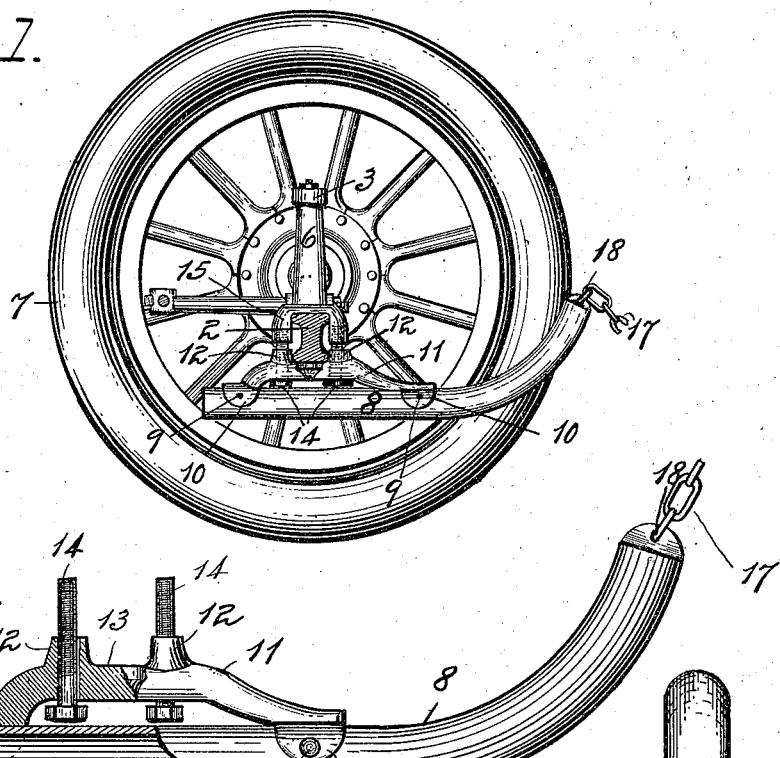
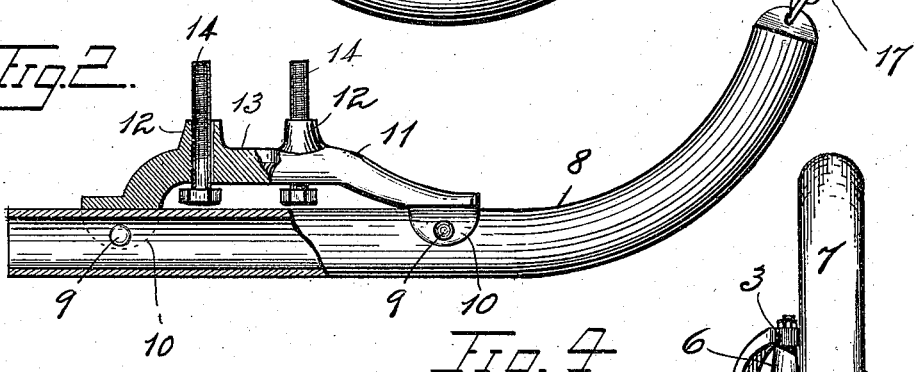
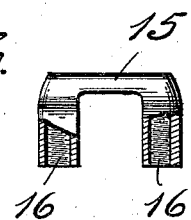
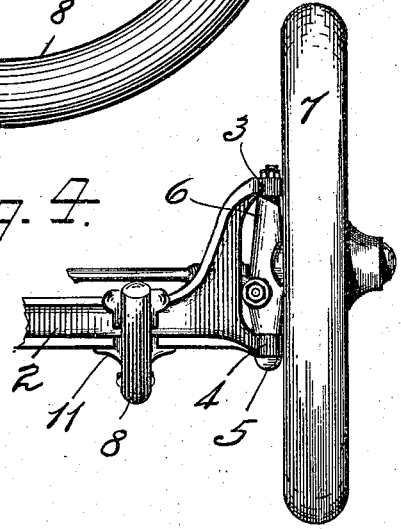
WITNESSES:
INVENTOR:
C. H. Hoover,
By H. M. Richards,
atty.
THE COLUMBIA PLANOGRAPH CO., WASHINGTON, D. C.

UNITED STATES PATENT OFFICE.

CHARLES H. HOOVER, OF GALESBURG, ILLINOIS.

SAFETY ATTACHMENT FOR AUTOMOBILE-AXLES.

1,178,722.  Specification of Letters Patent.  Patented Apr. 11, 1916.

Application filed August 14, 1914. Serial No. 856,856.

*To all whom it may concern:*

Be it known that I, CHARLES H. HOOVER, a citizen of the United States, and a resident of Galesburg, in the county of Knox and State of Illinois, have invented a new and useful Safety Attachment for Automobile-Axles, of which the following is a specification.

One of the most prolific causes of automobile accidents is the breaking of the front axle, at or near the joint. Whenever one does break at this point the broken end comes heavily and speedily (forward) into contact with the roadbed and the effect is either to cause the car to "turn turtle" or to throw it sharply toward the adjacent side of the road, resulting in turning the car over onto its side, running into ditches, bridge-rails, etc., or off an embankment, resulting disastrously to the occupants of the car as well as to the car itself.

The primary object of my invention is to provide a simple attachment to the front axle, which attachment, in the event of breakage of either the axle or the wheel, or the loss of the latter, will effectively prevent an accident resulting therefrom.

In the accompanying drawing, which illustrates a preferred embodiment of my invention: Figure 1 is a side elevation of a simple embodiment of my invention, shown as applied on the axle proper of an automobile, seen as looking from the longitudinal median portion of the axle and toward the left front wheel, the axle proper being shown in section; Fig. 2, an enlarged side elevation, partly in section; Fig. 3, a detail, partly in side elevation and partly in section; and Fig. 4, a front elevation of the parts shown in Fig. 1.

Coming now to a detailed description of the parts illustrated in said drawings and referring to each thereof by a distinguishing reference character, uniformly employed throughout the several views, 2 represents a common type of automobile axle proper, its ends being bifurcated and each of the arms 3, 4 provided with a vertically arranged aperture. These apertures register and are adapted for the reception of a hinge-pin or pintle 5 by which a vertically arranged journal-connection 6 having the usual journal or spindle (not shown) on which is mounted the wheel 7.

8 designates a curved, tubular skate or skid-shoe, the front end of which is preferably pre-shaped and then pressed together to close the opening therein. Its body portion is provided with suitable apertures for the reception of rivets 9 by means of which the legs 10 of a bracket 11 are rigidly secured to the supporting skid. 12, 12 designate apertured bosses on said bracket, spaced apart to provide a seat 13 for the axle 2. Prior to securement of the rivets 9 bolts 14 are inserted one through each of said bosses and into the feet of a cap-yoke 15, the interiorly arranged threads 16 of which said bolts are adapted to engage, whereby the axle may be bound very securely by said cap-yoke and bracket.

17, 17 designate chain links or the like, secured by means of an aperture 18 in the front end of the shoe and adapted to be secured to the front guard rail or other stationary part of the automobile adjacent said front end of the shoe.

While it is purposed to apply one of my attachments to each end of the front axle only, it will be evident that one may be applied to each end of the rear axle also if desired. Also it will be clear that brackets and caps (or other means for securing the skid or shoe to the axle) differing greatly in structural details from those shown in the accompanying drawings, may be applied to axles differing in outline from the axle 2 shown.

I am aware that devices fixed on the axles of carriages and having small wheels adapted to roll upon the ground in the event of the spindle breaking, have been used, but the structural features and mode of attachment of these to the axle are so impractical that they have not been successful.

It will be clear that when an automobile is equipped with my improvements the axle proper (even if the wheel and spindle are broken entirely off,) will be sustained by the skate, which itself will slide along on the ground until the power is shut off, the brake applied, and the machine stopped. Being cylindrical the skate will slide freely on practically any sort of surface onto which it falls. The chain 17, secured as it is to a stationary part of the automobile, will prevent the front end or nose of the skate from striking into the ground or from turning under—both of which contingencies would occur in the use of the wheeled attachment above referred to.

Another feature of my invention which is to be noted is that the elements 11 and 15 are to be positioned on the axle and connected each with the other before the former is secured to the skate 8. It will thus be impossible for them to become separated from each other by reason of the bolts becoming loosened and falling off, for should they become somewhat loosened their heads will strike and be stopped by the skate.

Should the axle be jacked up and the wheel removed, and the jack happen to slip, as it frequently does, there will be no resultant injury to either the axle proper, the axle joint, or the spindle, caused by any of those portions striking the floor, the jack or any other object, for the weight of that corner (so to speak) of the machine will fall on the skid or shoe and prevent any of the numerous accidents which have resulted from jacked-up axles.

Having thus described the nature of my improvements I claim as new the following, to-wit:

1. In an automobile, an axle, an inverted U-shaped yoke embracing it, a skate, an elongated bracket secured to said skate, and a pair of screw-bolts passed through said brackets and threaded into said yoke.

2. The combination with an axle, of a cap-yoke embracing the axle, a skate having a horizontal supporting portion and upwardly turned front end, a bracket secured on said horizontal portion, and bolts engaging said bracket and threaded into the legs of the cap-yoke.

3. A device for supporting an axle, comprising a tubular, elongated skate having a horizontal bearing portion and an upturned front end, a stirrup-like bracket having legs striding said horizontal portion, means for securing said legs to said bracket, a cap-yoke striding the axle, and bolts passed through said bracket and threaded into the legs of the yoke.

4. A device for supporting an axle, comprising a tubular, elongated skate having a horizontal bearing portion and an upturned front end, a bracket having legs striding said horizontal portion, means for securing said legs to said bracket, a cap-yoke striding the axle, bolts passed through said bracket and threaded into the legs of the yoke, and means secured to the extremity of said upturned end and adapted for securement to a stationary part of an automobile, for preventing said front end from striking into the ground.

In testimony whereof I hereto affix my signature at Galesburg, county of Knox and State of Illinois, this 27th day of July, 1914.

CHARLES H. HOOVER.

Witnesses:
G. WENZELMANN,
J. PARK GILBERT.